(12) United States Patent
Liu et al.

(10) Patent No.: US 12,485,651 B2
(45) Date of Patent: Dec. 2, 2025

(54) METAL-CLAD LAMINATE

(71) Applicant: TAIWAN UNION TECHNOLOGY CORPORATION, Zhubei (TW)

(72) Inventors: Shur-Fen Liu, Zhubei (TW); Jui-Hsiang Tang, Zhubei (TW)

(73) Assignee: Taiwan Union Technology Corporation, Zhubei (TW)

( * ) Notice: Subject to any disclaimer, the term of this patent is extended or adjusted under 35 U.S.C. 154(b) by 12 days.

(21) Appl. No.: 18/828,729

(22) Filed: Sep. 9, 2024

(65) Prior Publication Data

US 2025/0303674 A1 Oct. 2, 2025

(30) Foreign Application Priority Data

Mar. 27, 2024 (TW) .................... 113111478

(51) Int. Cl.
| | |
|---|---|
| *B32B 3/10* | (2006.01) |
| *B32B 5/02* | (2006.01) |
| *B32B 5/26* | (2006.01) |
| *B32B 15/14* | (2006.01) |
| *B32B 15/20* | (2006.01) |

(52) U.S. Cl.
CPC ............... *B32B 15/14* (2013.01); *B32B 5/02* (2013.01); *B32B 5/26* (2013.01); *B32B 15/20* (2013.01); *B32B 2260/023* (2013.01); *B32B 2260/046* (2013.01); *B32B 2262/101* (2013.01); *B32B 2307/202* (2013.01); *B32B 2307/204* (2013.01)

(58) Field of Classification Search
None
See application file for complete search history.

(56) References Cited

U.S. PATENT DOCUMENTS

| | | | |
|---|---|---|---|
| 4,849,284 A | 7/1989 | Arthur et al. | |
| 2022/0348730 A1 | 11/2022 | Ye et al. | |

FOREIGN PATENT DOCUMENTS

| | | |
|---|---|---|
| TW | 202110654 A | 3/2021 |
| TW | 202243878 A | 11/2022 |
| TW | 202311422 A | 3/2023 |
| WO | WO-2022259992 A1 * | 12/2022 |

OTHER PUBLICATIONS

Machine translation of WO-2022259992-A1 (Year: 2022).*

* cited by examiner

*Primary Examiner* — Christopher M Polley
(74) *Attorney, Agent, or Firm* — Christensen, Fonder, Dardi & Herbert PLLC; John P. Fonder

(57) ABSTRACT

A metal-clad laminate is provided. The metal-clad laminate includes: a dielectric layer, which has a dielectric material; and a conductive layer, which is disposed on at least one side of the dielectric layer. The dielectric material includes a fluoropolymer (A) and a filler (B). The fluoropolymer (A) has a crystallinity of not less than 40%. The filler (B) has a specific surface area of less than 2.5 m²/g.

10 Claims, No Drawings

METAL-CLAD LAMINATE

CLAIM FOR PRIORITY

This application claims the benefit of Taiwan Patent Application No. 113111478 filed on Mar. 27, 2024, the subject matters of which are incorporated herein in their entirety by reference.

BACKGROUND OF THE INVENTION

Field of the Invention

The present invention provides a metal-clad laminate, especially a metal-clad laminate comprising a dielectric layer made from a particular dielectric material.

Descriptions of the Related Art

As electronic products continue to evolve towards higher frequencies, higher speeds, miniaturization, and higher circuit density, the requirements for the physicochemical properties of electronic materials are also increasing. The characteristics of traditional epoxy resin dielectric materials are no longer sufficient, and they are being replaced by fluoropolymers as the dielectric material in metal-clad laminates. The resultant metal-clad laminates not only possess excellent dielectric properties but also possess good chemical resistance to acids and bases, moisture resistance, and flame retardancy.

However, fluoropolymers have poor dimensional stability at different temperatures, which results in unsatisfactory product reliability. To address this, a known approach is to add as much filler as possible to the fluororesin composition to improve dimensional stability by increasing the filler content. For example, U.S. Pat. No. 4,849,284 A teaches adding a large amount of ceramic filler to fluoropolymer, such that the filler accounts for at least 55 wt % of the overall material, thereby improving dimensional stability. However, the inventor of the present invention has found through research that adding a large amount of filler results in deterioration of the dielectric properties of the resultant metal-clad laminate.

SUMMARY OF THE INVENTION

In view of the above technical problems, the present invention provides a metal-clad laminate, which comprises a dielectric layer and a conductive layer, wherein the dielectric material comprises a fluoropolymer with a particular crystallinity and a filler with a particular specific surface area. The metal-clad laminate of the present invention shows good dimensional stability and environmentally stable dielectric properties, particularly a low dielectric dissipation factor (Df) and a low variation in dielectric dissipation factor ($\Delta$Df), making it especially suitable for high-frequency and high speed applications.

Specifically, an objective of the present invention is to provide a metal-clad laminate, which comprises:
a dielectric layer, which comprises a dielectric material; and
a conductive layer, which is disposed on at least one side of the dielectric layer,
wherein the dielectric material comprises a fluoropolymer (A) and a filler (B), the fluoropolymer (A) has a crystallinity of not less than 40%, and the filler (B) has a specific surface area of less than 2.5 $m^2/g$.

In one embodiment of the present invention, the fluoropolymer (A) has a crystallinity ranging from 40% to 80%.

In one embodiment of the present invention, the filler (B) has a specific surface area ranging from 0.3 $m^2/g$ to 2.0 $m^2/g$.

In one embodiment of the present invention, the filler (B) is selected from the group consisting of silicon dioxide, alumina, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond powder, diamond-like powder, graphite, calcined kaolin, pyran, mica, hydrotalcite, glass bead, ceramic whisker, carbon nanotube, nanosized inorganic powder, strontium titanate, and combinations thereof.

In one embodiment of the present invention, based on the total weight of the dielectric material, the amount of the filler (B) ranges from 34 wt % to 59 wt %.

In one embodiment of the present invention, the fluoropolymer (A) is selected from the group consisting of polytetrafluoroethylene (PTFE), fluorinated ethylene propylene copolymer (FEP copolymer), polyfluoroalkoxy alkane (PFA), polychlorotrifluoroethylene (PCTFE), polyvinylidene difluoride (PVDF), polyvinyl fluoride (PVF), ethylene-tetrafluoroethylene copolymer (ETFE copolymer), ethylene-chloro trifluoroethylene copolymer (ECTFE copolymer), and combinations thereof. In the preferred embodiments of the present invention, the fluoropolymer (A) is PTFE, FEP copolymer or PFA.

In one embodiment of the present invention, the fluoropolymer (A) has a fluorine atom content of 60% or more based on the total atom number of repeating units of the fluoropolymer (A).

In one embodiment of the present invention, based on the total weight of the dielectric material, the amount of the fluoropolymer (A) ranges from 40 wt % to 65 wt %.

In one embodiment of the present invention, the dielectric layer further comprises a reinforcing material.

In one embodiment of the present invention, the conductive layer is a copper conductive layer.

In one embodiment of the present invention, the conductive layer is a patterned conductive layer.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and in the claims should include both the singular and the plural forms.

As used herein, the term "fluoropolymer" refers to a fluorocarbon-based polymer containing multiple fluorine atoms bonded to carbon atoms.

As used herein, the total weight of dielectric material refers to the total weight of the dielectric material in the metal-clad laminate after the hot-pressing process, and therefore does not include the weight of solvent.

The metal-clad laminate of the present invention shows good dimensional stability and environmentally stable dielectric properties, particularly low Df and low ΔDf, by including a dielectric layer made from a specific dielectric material. This specific dielectric material comprises a fluoropolymer with specific crystallinity and a filler with a particular specific surface area. Further details about the metal-clad laminate and its applications are elaborated below.

1. Metal-Clad Laminate

The metal-clad laminate of the present invention comprises a dielectric layer and a conductive layer formed on at least one side of the dielectric layer. In one embodiment of the present invention, the metal-clad laminate comprises a dielectric layer and conductive layers formed on both sides of the dielectric layer, respectively. In one embodiment of the present invention, the metal-clad laminate essentially consists of or consists of the dielectric layer and the conductive layers formed on both sides of the dielectric layer, respectively.

The metal-clad laminate of the present invention can be manufactured as follows. First, provide a prepreg or several prepregs that are superimposed, and then superimpose a metal foil on at least one outer surface of the prepreg or the superimposed prepregs to provide a superimposed object. Subsequently, perform a hot-pressing operation on the superimposed object to obtain the metal-clad laminate. The hot-pressing conditions can be as described below. Initially, the temperature in the hot press machine is increased from room temperature (25° C.) to 380° C. at a heating rate of 10° C./min under a pressure of 30 kg/cm$^2$. Then, the cooling rate from 380° C. to 240° C. is controlled, for example, at a cooling rate ranging from 1.0° C./min to 4.0° C./min, to control the crystallinity of the fluoropolymer in the dielectric layer. Subsequently, the temperature is allowed to cool naturally to room temperature. Generally, the higher the cooling rate, the lower the crystallinity of the fluoropolymer. In the appended examples, the cooling rate from 380° C. to 240° C. is controlled to be 3.00° C./min, 2.75° C./min, 1.00° C./min, 0.46° C./min, 0.30° C./min, or 0.25° C./min.

1.1. Dielectric Layer

In the metal-clad laminate of the present invention, the dielectric layer comprises a dielectric material, and optionally a reinforcing material. In one embodiment of the present invention, the dielectric layer essentially consists of or consists of the dielectric material and the reinforcing material.

The dielectric layer can be provided by subjecting one or more prepregs to a hot-pressing procedure for preparing metal-clad laminates. The aforementioned prepregs can be manufactured by impregnating a reinforcing material with a fluororesin composition or coating a fluororesin composition onto a reinforcing material, and drying the impregnated or coated reinforcing material. The aforementioned impregnation or coating processes can be repeated multiple times, for example, 2 to 4 times, to achieve the desired thickness. Examples of impregnating or coating methods include, but are not limited to, dipping, roller coating, die coating, bar coating, and spraying. The drying condition can be at a temperature of 200° C. to 600° C. for 1 (one) minute to 30 minutes.

The aforementioned fluororesin composition can be prepared in the following manner. Initially, the components used to form the fluororesin composition, including the fluororesin that can form the fluoropolymer (A), the filler (B) and optional components, are uniformly mixed with a stirrer and dissolved or dispersed in a solvent to form a slurry, colloidal group, varnish, or other forms for subsequent processing. The solvent can be any inert solvent that can dissolve or disperse the components of the fluororesin composition but does not react with the components of the fluororesin composition. Examples of the solvent that can dissolve or disperse the components of the fluororesin composition include, but are not limited to, water, ethanol, isopropanol, acetone, toluene, γ-butyrolactone, methyl ethyl ketone, cyclohexanone, butanone, xylene, methyl isobutyl ketone, N,N-dimethylformamide (DMF), N,N-dimethylacetamide (DMAc), and N-methylpyrolidone (NMP). The aforementioned solvents can be used alone or in a mixture of two or more. The amount of the solvent in the fluororesin composition is not particularly limited as long as the components of the fluororesin composition can be evenly dissolved or dispersed therein. In the appended examples, water is used.

The types of the aforementioned optional components are not particularly limited, as long as there are no adverse effects on the physicochemical and dielectric properties of the metal-clad laminate of the present invention. Examples of the optional components include, but are not limited to, a thickening agent, a dispersing agent, a toughener, and a viscosity modifying agent. Such additives are those that persons skilled in the art can select based on practical needs after reviewing the disclosure of this specification. The following explanation will use thickening agents as an example.

Thickening agents are used to improve and increase consistency, maintain stability, and improve physical properties. The type of the thickening agent is not particularly limited. For example, the thickening agent can be a cellulose-based thickening agent, an acrylate-based thickening agent, a polyurethane-based thickening agent, and an inorganic thickening agent. The aforementioned thickening agents can be used alone or in a mixture of two or more. For example, a cellulose-based water-soluble thickening agent can be used to impart better rheological property to the fluororesin composition and improve its adhesion to the reinforcing material. Specific examples of the water-soluble thickening agent usable for the present invention include, but are not limited to, cellulose, hydroxyethyl cellulose, nitrocellulose, polymethylstyrene, poly(methyl methacrylate), and polyethylene glycol. The aforementioned water-soluble thickening agents can be used alone or in a mixture of two or more. Based on the solid content of the fluororesin composition, the content of the thickening agent can range from 0 wt % to 0.1 wt %. For example, based on the solid content of the fluoresin composition, the content of the thickening agent can be 0 wt %, 0.01 wt %, 0.02 wt %, 0.03 wt %, 0.04 wt %, 0.05 wt %, 0.06 wt %, 0.07 wt %, 0.08 wt %, 0.09 wt %, or 0.1 wt %, or within a range between any two of the values described herein.

1.1.1. Reinforcing Material

The types of the reinforcing material are not particularly limited, and any conventional reinforcing material in the art can be used. Generally, the reinforcing material can include fibers selected from the group consisting of glass fibers, inorganic fibers other than glass fibers, organic fibers, and combinations thereof, but the reinforcing material is not limited thereto. Examples of glass fibers include, but are not limited to, E-glass fibers, NE-glass fibers, S-glass fibers, L-glass fibers, D-glass fibers, T-glass fibers, Q-glass fibers, UN-glass fibers, and spherical glass. Examples of inorganic fibers other than glass fibers include, but are not limited to, quartz fibers, paper fibers, and carbon fibers. Examples of organic fibers include, but are not limited to, polyimide, polyamide (e.g., Kevlar), polytetrafluoroethylene, ultra-high molecular weight polyethylene (UHMWPE), and high-modulus polypropylene (HMPP). The forms of reinforcing materials include, but are not limited to, woven fabric, non-woven fabric, roving, chopped strand mat, and surfacing mat.

Generally, suitable reinforcing materials can be selected to meet the required properties. For example, from the perspective of dimensional stability, it is preferable to use fabrics that have undergone super fiber opening treatment and leveling treatment as the reinforcing material. From the perspective of moisture absorption resistance and thermal resistance, it is preferable to use glass fiber woven fabrics that have undergone surface treatments such as epoxy silane treatment or silane coupling agent treatment as the reinforcing material. From the perspective of electrical properties, it is preferable to use glass fiber fabrics with low dielectric constant (Dk) and low Df, such as NE-glass fibers, L-glass fibers, or Q-glass fibers, as the reinforcing material. In the appended examples, reinforcing NE-glass fibers are used.

1.1.2. Dielectric Material

The dielectric material comprises a fluoropolymer (A) and a filler (B), and optionally one or more conventional additives. Examples of conventional additives include, but are not limited to, one or more selected from the group consisting of a thickening agent, a dispersing agent, a toughener, and a viscosity modifying agent. In the preferred embodiments of the present invention, the dielectric material comprises the fluoropolymer (A), the filler (B) and a thickening agent. Alternatively, the dielectric material essentially consists of or consists of the fluoropolymer (A), the filler (B) and a thickening agent.

[Fluoropolymer (A)]

In the metal-clad laminate, the fluoropolymer (A) has a crystallinity of not less than 40%. In one embodiment of the present invention, the fluoropolymer (A) has a crystallinity ranging from 40% to 80%. For example, the crystallinity of the fluoropolymer (A) can be 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%, or within a range between any two of the values described herein. When the crystallinity of the fluoropolymer (A) is less than the specified range, the resultant metal-clad laminate has higher Df and $\Delta$Df, as well as poor dimensional stability.

As used herein, crystallinity refers to the proportion of crystalline region in the polymer. Crystallization in polymers refers to the process of chain alignment, during which the polymer chains fold to form ordered regions. Generally, the alignment of chains is usually caused by thermal motion. During the manufacturing process of metal-clad laminate, as the dielectric material undergoes a hot-pressing process, the fluoropolymer (A) in the dielectric material will have a certain degree of crystallinity. In the metal-clad laminate of the present invention, the fluoropolymer (A) has a crystallinity of not less than 40%.

The fluoropolymer refers to a fluorocarbon-based polymer containing multiple fluorine atoms bonded to carbon. Examples of the fluoropolymer (A) include, but are not limited to, PTFE, FEP copolymer, PFA, PCTFE, PVDF, PVF, ETFE copolymer, and ECTFE copolymer. The aforementioned fluoropolymers can be used alone or in a mixture of two or more. In one embodiment of the present invention, the fluoropolymer (A) has a fluorine atom content of 60% or more based on the total atom number of repeating units of the fluoropolymer (A). In the preferred embodiments of the present invention, the fluoropolymer (A) is PTFE, FEP copolymer, or PFA.

For process convenience, the fluoropolymer (A) in the form of a dispersion (e.g., the fluororesin composition mentioned earlier) can be used to prepare dielectric material. However, the present invention is not limited thereto; other forms of fluoropolymer (A) can also be used, such as fluoropolymer (A) in powder form. When using fluoropolymer (A) in the form of a dispersion, it also has the advantage of easily dispersing the filler (B) and optional constituents uniformly within the dispersion.

The crystallinity of the fluoropolymer (A) can be measured using differential scanning calorimetry (DSC). The testing procedure is as follows, with the instrument for measuring crystallinity being a differential scanning calorimeter (model: Q20) available from TA Instruments. Initially, the metal foil of a metal-clad laminate is etched away to prepare the test sample. Subsequently, the test sample is placed on a measurement platform and heated from room temperature to 400° C. at a heating rate of 10° C./min. Then, the test sample is cooled from 400° C. to 200° C. at a cooling rate of 2° C./min, and then naturally cooled down to room temperature, resulting in a DSC curve for the test sample. The exothermic peaks from 250° C. to 350° C. are integrated to obtain the crystallization enthalpy $\Delta$H of the test sample. The crystallization enthalpy $\Delta$H is divided by the 100% crystallization enthalpy of the fluoropolymer (A) (usually 82 J/g), and resulting value represents the crystallinity of fluoropolymer (A).

In one embodiment of the present invention, based on the total weight the dielectric material, the content of the fluoropolymer (A) ranges from 40 wt % to 65%. For example, based on the total weight the dielectric material, the content of the fluoropolymer (A) can be 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, or 65 wt %, or within a range between any two of the values described herein.

[Filler (B)]

In the metal-clad laminate of the present invention, the filler (B) has a specific surface area of less than 2.5 m$^2$/g, and preferably a specific surface area from 0.3 m$^2$/g to 2.0 m$^2$/g. For example, the specific surface of the filler (B) can be 0.3 m$^2$/g, 0.4 m$^2$/g, 0.5 m$^2$/g, 0.6 m$^2$/g, 0.7 m$^2$/g, 0.8 m$^2$/g, 0.9 m$^2$/g, 1.0 m$^2$/g, 1.1 m$^2$/g, 1.2 m$^2$/g, 1.3 m$^2$/g, 1.4 m$^2$/g, 1.5 m$^2$/g, 1.6 m$^2$/g, 1.7 m$^2$/g, 1.8 m$^2$/g, 1.9 m$^2$/g, or 2.0 m$^2$/g, or within a range between any two of the values described herein.

The specific surface is measured using the Brunauer-Emmett-Teller method (BET method), which is a gas adsorption technique for fine ceramic powders. Initially, the test sample of filler (B) is placed in a specific surface area and porosimetry analyzer, ensuring that the testing environment is a closed environment. Subsequently, under constant temperature and pressure conditions, the test sample is allowed to adsorb an inert gas (such as nitrogen or helium), leading to equilibrium pressure variation. The equilibrium pressure variation is used to calculate the surface area and pore size. The volume of the pores can be calculated when the absorbed gas molecules condense into a liquid within the pores. The constant temperature and pressure conditions can be, for example, 25° C. and 1 (one) atm.

For the filler (B) usable for the metal-clad laminate of the present invention, there are not particular restrictions on the type as long as it has the specified specific surface area. For example, the choice of filler type can be based on the properties of the metal-clad laminate to be improved, such as mechanical strength or thermal conductivity. Examples of the filler (B) include, but are not limited to, silicon dioxide (including spherical silicon dioxide, fused silicon dioxide, non-fused silicon dioxide, porous silicon dioxide, hollow silicon dioxide, and nano silicon dioxide), alumina, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond powder, diamond-like powder, graphite, calcined kaolin, pyran, mica, hydrotalcite, glass bead, ceramic whisker, carbon nanotube, nanosized inorganic powder, and strontium titanate. The aforementioned fillers can be used alone or in any combination.

The filler (B) can be subjected to surface treatment(s) in advance as needed, in order to bond specific functional groups to the surface of the filler (B) and alter its physicochemical properties. Examples of the functional groups include, but are not limited to, alkyl, vinyl, an acrylic group, a methacrylic group, amino, ureido, phenyl, glycidyl, anilino, an isocyanuric group, and styryl. In one embodiment of the present invention, the filler (B) is a silane-modified filler. Silanes used for surface treatment can have one or more of alkyl, vinyl, an acrylic group, a methacrylic group, amino, ureido, phenyl, glycidyl, anilino, an isocyanuric group, and styryl. Particular examples of silanes used for surface treatment include, but are not limited to, phenylsilane, vinyltrimethoxysilane, (3-mercaptopropyl)trimethoxysilane, (3-acryloxypropyl)trimethoxysilane, (3-methacryloxypropyl)trimethoxysilane, (3-glycidoxypropyl)trimethoxysilane, (3-glycidoxypropyl)methyldimethoxysilane, 3-aminopropyltrimethoxysilane, 3-(2-aminoethyl)aminopropyltrimethoxysilane, 3-(2-aminoethyl)propylmethyldimethoxysilane, 3-anilinopropyltrimethoxysilane, 3-ureidopropyltrimethoxysilane, methyltrimethoxysilane, dimethyldimethoxysilane, trimethylmethoxysilane, methyltriphenoxysilane, n-propyltrimethoxysilane, n-butyltrimethoxysilane, isobutyltrimethoxysilane, n-hexyltrimethoxysilane, cyclohexyltrimethoxysilane, n-octyltrimethoxysilane, n-decyltrimethoxysilane, 1,6-bis(trimethoxysilanyl)hexane, phenyltrimethoxysilane, diphenyldimethoxysilane, parastyryltrimethoxysilane, 2-(3,4-epoxycyclohexyl)ethyltrimethoxysilane, N-phenyl-3-aminopropyltrimethoxysilane, and 1,3,5-N-tris(trimethoxysilanylpropyl)triisocyanurate. In the appended examples, phenylsilane-modified silica filler is used.

In one embodiment of the present invention, based on the total weight of the dielectric material, the amount of the filler (B) ranges from 34 wt % to 59 wt %. For example, based on the total weight of the dielectric material, the amount of the filler (B) can be 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, or 59 wt %, or within a range between any two of the values described herein.

1.2. Conductive Layer

Examples of the material usable for forming the conductive layer include, but are not limited to, copper, stainless steel, aluminum, zinc, iron, nickel, gold, silver, a transition metal, and an alloy of two or more aforementioned metals. In one embodiment of the present invention, the conductive layer is a copper conductive layer, and preferably a copper foil.

The surface of the copper foil may be either roughened or unroughened. Examples of copper foil include, but are not limited to, a high temperature elongation (HTE) copper foil (surface roughness Ra: 6 µm to 10 µm), a reverse treatment foil (RTF) (surface roughness Ra: 2 µm to 5 µm), a very low profile (VLP) copper foil (surface roughness Ra: less than 2 µm), and a hyper very low profile (HVLP) copper foil (surface roughness Ra: less than 1.5 µm). In the appended examples, an HTE copper foil is used.

In the metal-clad laminate of the present invention, the conductive layer can be a patterned conductive layer, thus making the metal-clad laminate suitable for use as a printed circuit board. The patterned conductive layer can be formed by applying a conductive layer (e.g., a copper foil) to the surface of the dielectric layer and then further etching it. Alternatively, the patterned conductive layer can be formed directly on the surface of the dielectric layer using screen printing or ink-jet printing methods.

2. Example 2.1. Testing Methods

The present invention is further illustrated by the embodiments hereinafter, wherein the testing instruments and methods are as follows.

[Dielectric Loss Factor (Df) Measurement]

Initially, metal-clad laminates with a length of 24 inches and a width of 18 inches is etched to remove the metal foil to prepare test samples. The initial Df (hereinafter "0 hour Df") of the test samples is measured and calculated according to IPC-TM-650 2.5.5.13 standard under an operating frequency of 10 GHz. Next, the test samples are placed in an environmental test oven at a temperature of 85° C. and a relatively humidity of 85%, and are maintained for 72 hours, 168 hours, 240 hours, 336 hours, 408 hours, and 504 hours, respectively. Afterward, the test samples are taken out from the environmental test oven and rested at a temperature of 25° C. and a relative humidity of 60% for 30 minutes. Then, the Df of the test samples are measured and calculated according to IPC-TM-650 2.5.5.13 standard under an operating frequency of 10 GHz to obtain the Df values for 72 hours, 168 hours, 240 hours, 336 hours, 408 hours, and 504 hours.

[Dimensional Stability Test]

The metal-clad laminate is cut into test samples with a width of 11 inches and a length of 12 inches, and positioning holes are disposed at the four corners of the test sample. The longitudinal distance W1 and the lateral distance F1 between the positioning holes are measured. Subsequently, the test sample is etched to remove the metal foil, and the test sample without metal foil is placed in an oven at 150° C. for 1 (one) hour. Afterward, the baked test sample is positioned, and the longitudinal distance W2 and the lateral distance F2 are measured. The dimensional stability data in the longitudinal and lateral directions of the metal-clad laminate are obtained by calculating using the following equations and converting the percentage into ppm unit.

$$\text{Dimensional stability in longitudinal direction} = \frac{(W2 - W1)}{W1} \times 100\%$$

-continued $$\text{Dimensional stability in lateral direction} = \frac{(F2 - F1)}{F1} \times 100\%$$

[Specific Surface Area Measurement]

First, the test sample of the filler (B) is placed in a specific surface area and porosimetry analyzer, ensuring the test environment is a closed environment. Subsequently, under constant temperature and pressure conditions, the test sample is allowed to adsorb an inert gas (e.g., nitrogen or helium), leading to equilibrium pressure variation. The equilibrium pressure variation is used to calculate the surface area and pore size. The volume of the pores can be calculated when the absorbed gas molecules condense into a liquid within the pores. The constant temperature and pressure conditions refer to 25° C. and 1 (one) atm.

[Crystallinity Measurement]

First, metal-clad laminates with a length of 24 inches and a width of 18 inches is etched to remove the metal foil to prepare test samples. Subsequently, the test sample is placed on the measurement platform, and the test sample is heated from room temperature to 400° C. at a heating rate of 10° C./min. Next, the test sample is cooled to 200° C. at a cooling rate of 2° C./min, and then naturally cooled down to room temperature, resulting in a DSC curve for the test sample. The exothermic peaks from 250° C. to 350° C. are integrated to obtain the crystallization enthalpy ΔH of the test sample. The crystallization enthalpy ΔH is divided by the 100% crystallization enthalpy of the fluoropolymer (A) (usually 82 J/g), and resulting value represents the crystallinity of fluoropolymer (A).

2.2. List of Raw Materials Used in Examples and Comparative Examples

TABLE 1

List of raw materials

| Model no. | Description |
|---|---|
| D210 | PTFE dispersion, solid content: 60%, available from Daikin Industries |
| 335D | PFA dispersion, solid content: 60%, available from Chemous |
| ND-4R | FEP copolymer dispersion, solid content: 40%, available from Daikin Industries |
| DQM8015 | Phenylsilane-modified $SiO_2$ filler, specific surface area: 0.33 $m^2/g$, available from Zhejiang Sanshi New Material Technology |
| VF-33 | Phenylsilane-modified $SiO_2$ filler, specific surface area: 2 $m^2/g$, available from Zhejiang Sanshi New Material Technology |
| NQ2110HP | Phenylsilane-modified $SiO_2$ filler, specific surface area: 0.6 $m^2/g$, available from Jiangsu NOVORAY New Material |
| NQ6080HP | Phenylsilane-modified $SiO_2$ filler, specific surface area: 0.8 $m^2/g$, available from Jiangsu NOVORAY New Material |
| NQ6030HP | Phenylsilane-modified $SiO_2$ filler, specific surface area: 1.3 $m^2/g$, available from Jiangsu NOVORAY New Material |
| SS0315BZ | Phenylsilane-modified $SiO_2$ filler, specific surface area: 2.5 $m^2/g$, available from SIBELCO |
| FMC53001 | Water-soluble thickening agent: cellulose, available from Lotte Fine Chemical |
| NE1035 | NE-glass fiber fabric, available from NAN YA PLASTICS |
| NE1078 | NE-glass fiber fabric, available from NAN YA PLASTICS |

2.3. Preparation of Metal-Clad Laminate

<Preparation of Fluororesin Composition>

According to the proportions shown in Table 2-1, Table 2-2 and Table 2-3, the fluororesin compositions of Examples 1 to 23 and Comparative Examples 1 to 7 were prepared in the following manners. First, each component was mixed using a stirrer at room temperature, and pure water was added as a solvent. Subsequently, the resultant mixture was stirred at room temperature for 60 to 120 minutes to obtain each fluororesin composition.

The specific surface area of the fillers used in Examples 1 to 23 and Comparative Examples 1 to 7 was measured according to the aforementioned testing methods, and the results are tabulated in Table 2-1, Table 2-2 and Table 2-3.

TABLE 2-1

Constitution of fluororesin compositions of Examples 1 to 5 and Comparative Example 1

| | | Example | | | | | Comparative |
|---|---|---|---|---|---|---|---|
| Parts by weight | | 1 | 2 | 3 | 4 | 5 | Example 1 |
| Fluororesin | D210 | 100 | 100 | 100 | 100 | 100 | 100 |
| Filler | DQM8015 | 78 | | | | | |
| | NQ2110HP | | 78 | | | | |
| | NQ6080HP | | | 78 | | | |
| | NQ6030HP | | | | 78 | | |
| | VF33 | | | | | 78 | |
| | SS0315BZ | | | | | | 78 |

TABLE 2-1-continued

Constitution of fluororesin compositions of
Examples 1 to 5 and Comparative Example 1

| Parts by weight | | Example 1 | Example 2 | Example 3 | Example 4 | Example 5 | Comparative Example 1 |
|---|---|---|---|---|---|---|---|
| Thickening agent | FMC53001 | 0.12 | 0.12 | 0.12 | 0.12 | 0.12 | 0.12 |
| Specific surface area of filler (unit: $m^2/g$) | | 0.33 | 0.6 | 0.8 | 1.3 | 2 | 2.5 |

Note:
The weight parts of the fluororesin are the weight parts of the dispersion.

TABLE 2-2

Constitution of fluororesin compositions of Examples
6 to 15 and Comparative Examples 2 to 3

| | | Fluororesin | Filler | | Thickening agent | Specific surface area of filler |
|---|---|---|---|---|---|---|
| Parts by weight | | D210 | NQ6080HP | VF33 | FMC53001 | (unit: $m^2/g$) |
| Example | 6 | 100 | | 78 | 0.12 | 2 |
| | 7 | 100 | 78 | | 0.12 | 0.8 |
| | 8 | 100 | | 78 | 0.12 | 2 |
| | 9 | 100 | 78 | | 0.12 | 0.8 |
| | 10 | 100 | | 78 | 0.12 | 2 |
| | 11 | 100 | 78 | | 0.12 | 0.8 |
| | 12 | 100 | | 78 | 0.12 | 2 |
| | 13 | 100 | 78 | | 0.12 | 0.8 |
| | 14 | 100 | | 78 | 0.12 | 2 |
| | 15 | 100 | 78 | | 0.12 | 0.8 |
| Comparative Example | 2 | 100 | | 78 | 0.12 | 2 |
| | 3 | 100 | 78 | | 0.12 | 0.8 |

Note:
The weight parts of the fluororesin are the weight parts of the dispersion.

TABLE 2-3

Constitution of fluororesin compositions of Examples
16 to 23 and Comparative Examples 4 to 7

| | | Fluororesin | | | Filler | Thickening agent | Specific surface area of filler |
|---|---|---|---|---|---|---|---|
| Parts by weight | | D210 | 335D | ND-4R | NQ6080HP | FMC53001 | (unit: $m^2/g$) |
| Example | 16 | | | 166 | 78 | 0.12 | 0.8 |
| | 17 | 62.5 | 37.5 | | 78 | 0.12 | 0.8 |
| | 18 | 62.5 | | 62.5 | 78 | 0.12 | 0.8 |
| | 19 | | 100 | | 78 | 0.12 | 0.8 |
| | 20 | | | 166 | 78 | 0.12 | 0.8 |
| | 21 | | 100 | | 78 | 0.12 | 0.8 |
| | 22 | 62.5 | 37.5 | | 78 | 0.12 | 0.8 |
| | 23 | 62.5 | | 62.5 | 78 | 0.12 | 0.8 |
| Comparative Example | 4 | | | 166 | 78 | 0.12 | 0.8 |
| | 5 | 62.5 | 37.5 | | 78 | 0.12 | 0.8 |
| | 6 | 62.5 | | 62.5 | 78 | 0.12 | 0.8 |
| | 7 | | 100 | | 78 | 0.12 | 0.8 |

Note:
The weight parts of the fluororesin are the weight parts of the dispersion.

<Preparation of Prepreg>

Prepregs of Examples 1 to 23 and Comparative Examples 1 to 7 were prepared in the following manners. First, glass fiber fabrics were respectively impregnated with the fluororesin compositions of Examples 1 to 23 and Comparative Examples 1 to 7 by means of a roller coating machine, and the thickness of the impregnated glass fiber fabric was controlled to an appropriate level. Subsequently, the impregnated glass fiber fabric was placed in an oven at 350° C. and heated for 2 minutes, thereby producing the prepreg. The glass fiber fabric used in Examples 1 to 5 and Comparative Example 1 is NE1035. The glass fiber fabrics used in Examples 6 to 23 and Comparative Examples 2 to 7 are as shown in the following Table 3-2, Table 3-3, Table 3-4, Table 3-5, Table 3-6 and Table 3-7.

<Preparation of Metal-Clad Laminate>

Metal-clad laminates of Examples 1 to 23 and Comparative Examples 1 to 7 were prepared respectively by using the prepregs of Examples 1 to 23 and Comparative Examples 1 to 7. First, several pieces of the prepreg were superimposed, and two sheets of copper foils (each 0.5 oz) were superimposed on the respective two surfaces of the outermost layers, and then the prepared objects were placed in a hot press machine to be cured through a high temperature hot-pressing to obtain the metal-clad laminates of Examples 1 to 23 and Comparative Examples 1 to 7. The hot-pressing conditions were as follows. First, the temperature is increased from room temperature (25° C.) to 380° C. at a heating rate of 10° C./min under a pressure of 30 kg/cm$^2$. Then, the temperature is lowered from 380° C. to 240° C. at the cooling rates shown in Table 3-1, Table 3-2, Table 3-3, Table 3-4, Table 3-5, Table 3-6 and Table 3-7, after which the temperature is allowed to cool naturally to room temperature.

The properties of the metal-clad laminates of Examples 1 to 23 and Comparative Examples 1 to 7, including crystallinity of the fluoropolymer (A), Df, and dimensional stability, were tested according to the aforementioned testing methods, and the results are tabulated in Table 3-1, Table 3-2, Table 3-3, Table 3-4, Table 3-5, Table 3-6 and Table 3-7.

TABLE 3-1

Properties of metal-clad laminates of Examples 1 to 5 and Comparative Example 1

|  |  | Example | | | | | Comparative |
|---|---|---|---|---|---|---|---|
|  |  | 1 | 2 | 3 | 4 | 5 | Example 1 |
| Cooling rate (unit: ° C./min) | | 2.75 | 2.75 | 2.75 | 2.75 | 2.75 | 2.75 |
| Crystallinity of fluoropolymer (A) | | 46% | 46% | 46% | 46% | 46% | 46% |
| Df × 10$^{-3}$ | 0 hour | 0.75 | 0.72 | 0.76 | 0.76 | 0.76 | 0.89 |
| @10 GHz | 168 hours | 0.71 | 0.79 | 1.04 | 1.14 | 1.14 | 1.46 |
|  | 240 hours | 0.83 | 0.81 | 1.13 | 1.21 | 1.23 | 1.54 |
|  | 336 hours | 0.89 | 0.88 | 1.17 | 1.23 | 1.29 | 1.61 |
|  | 408 hours | 0.92 | 0.95 | 1.23 | 1.29 | 1.31 | 1.71 |
|  | 504 hours | 1.03 | 1.03 | 1.26 | 1.32 | 1.32 | 1.91 |
| ΔDf × 10$^{-3}$ @10 GHz | | 0.28 | 0.31 | 0.50 | 0.56 | 0.56 | 1.02 |

Note:
ΔDf is the difference between the Df value at 504 hours and the Df value at 0 hour.

TABLE 3-2

Properties of metal-clad laminates of Examples 6 to 9

|  |  | Example | | | |
|---|---|---|---|---|---|
|  |  | 6 | 7 | 8 | 9 |
| Cooling rate (unit: ° C./min) | | 3.00 | 3.00 | 2.75 | 2.75 |
| Crystallinity of fluoropolymer (A) | | 40% | 40% | 46% | 46% |
| Df × 10$^{-3}$ | 0 hour | 0.76 | 0.76 | 0.76 | 0.76 |
| @10 GHz | 72 hours | 1.00 | 0.97 | 1.14 | 1.04 |
|  | 168 hours | 1.10 | 1.10 | 1.23 | 1.13 |
|  | 240 hours | 1.23 | 1.20 | 1.29 | 1.17 |
|  | 336 hours | 1.30 | 1.26 | 1.31 | 1.23 |
|  | 408 hours | 1.35 | 1.33 | 1.32 | 1.26 |
| ΔDf × 10$^{-3}$ | 0 hour | 0.00 | 0.00 | 0.00 | 0.00 |
| @10 GHz | 72 hours | 0.24 | 0.21 | 0.38 | 0.28 |
|  | 168 hours | 0.34 | 0.32 | 0.47 | 0.37 |
|  | 240 hours | 0.48 | 0.44 | 0.53 | 0.41 |
|  | 336 hours | 0.55 | 0.50 | 0.55 | 0.47 |
|  | 408 hours | 0.60 | 0.57 | 0.56 | 0.50 |
| Dimensional stability (unit: ppm) | NE1035 longitudinal | 1626 | 1602 | 1594 | 1576 |
|  | NE1035 lateral | 1019 | 1156 | 906 | 1180 |
|  | NE1078 longitudinal | 1500 | 1501 | 1451 | 1460 |
|  | NE1078 lateral | 869 | 1004 | 818 | 980 |

Note:
ΔDf is the difference between the Df value at a given time and the Df value at 0 hour. For example, ΔDf at 72 hours is the difference between the Df value at 72 hours and the Df value at 0 hour.

TABLE 3-3

Properties of metal-clad laminates of Examples 10 to 13

|  |  | Example | | | |
|---|---|---|---|---|---|
|  |  | 10 | 11 | 12 | 13 |
| Cooling rate (unit: ° C./min) | | 1.00 | 1.00 | 0.46 | 0.46 |
| Crystallinity of fluoropolymer (A) | | 59% | 59% | 66% | 66% |
| Df × 10$^{-3}$ | 0 hour | 0.76 | 0.75 | 0.75 | 0.73 |
| @10 GHz | 72 hours | 1.06 | 1.07 | 0.93 | 0.92 |
|  | 168 hours | 1.11 | 1.10 | 0.99 | 0.94 |
|  | 240 hours | 1.16 | 1.12 | 1.04 | 0.91 |
|  | 336 hours | 1.17 | 1.15 | 1.06 | 0.96 |
|  | 408 hours | 1.22 | 1.21 | 1.11 | 1.06 |
| ΔDf × 10$^{-3}$ | 0 hour | 0.00 | 0.00 | 0.00 | 0.00 |
| @10 GHz | 72 hours | 0.30 | 0.32 | 0.18 | 0.19 |
|  | 168 hours | 0.35 | 0.35 | 0.24 | 0.21 |
|  | 240 hours | 0.40 | 0.37 | 0.29 | 0.18 |
|  | 336 hours | 0.41 | 0.40 | 0.31 | 0.23 |
|  | 408 hours | 0.46 | 0.46 | 0.36 | 0.33 |

TABLE 3-3-continued

Properties of metal-clad laminates of Examples 10 to 13

| | | | Example | | | |
|---|---|---|---|---|---|---|
| | | | 10 | 11 | 12 | 13 |
| Dimensional stability (unit: ppm) | NE1035 | longitudinal | 1142 | 1219 | 1012 | 1071 |
| | | lateral | 802 | 1047 | 528 | 529 |
| | NE1078 | longitudinal | 1189 | 1031 | 1028 | 1016 |
| | | lateral | 732 | 893 | 684 | 770 |

Note:
ΔDf is the difference between the Df value at a given time and the Df value at 0 hour. For example, ΔDf at 72 hours is the difference between the Df value at 72 hours and the Df value at 0 hour.

TABLE 3-4

Properties of metal-clad laminates of Examples 14 to 15 and Comparative Examples 2 to 3

| | | Example | | Comparative Example | |
|---|---|---|---|---|---|
| | | 14 | 15 | 2 | 3 |
| Cooling rate (unit: °C./min) | | 0.30 | 0.25 | 3.00 | 3.00 |
| Crystallinity of fluoropolymer (A) | | 71% | 78% | 35% | 35% |
| Df × 10⁻³ @10 GHz | 0 hour | 0.74 | 0.74 | 0.76 | 0.77 |
| | 72 hours | 0.87 | 0.94 | 1.16 | 1.11 |
| | 168 hours | 0.92 | 0.94 | 1.22 | 1.20 |
| | 240 hours | 0.97 | 0.92 | 1.32 | 1.23 |
| | 336 hours | 0.98 | 0.95 | 1.37 | 1.32 |
| | 408 hours | 1.01 | 0.95 | 1.37 | 1.36 |
| ΔDf × 10⁻³ @10 GHz | 0 hour | 0.00 | 0.00 | 0.00 | 0.00 |
| | 72 hours | 0.13 | 0.20 | 0.40 | 0.34 |
| | 168 hours | 0.18 | 0.20 | 0.46 | 0.43 |
| | 240 hours | 0.23 | 0.18 | 0.56 | 0.46 |
| | 336 hours | 0.24 | 0.21 | 0.61 | 0.55 |
| | 408 hours | 0.27 | 0.21 | 0.61 | 0.59 |
| Dimensional stability (unit: ppm) | NE1035 longitudinal | 968 | 955 | 1657 | 1627 |
| | lateral | 425 | 350 | 1132 | 1131 |
| | NE1078 longitudinal | 908 | 811 | 1549 | 1542 |
| | lateral | 764 | 650 | 920 | 1027 |

Note:
ΔDf is the difference between the Df value at a given time and the Df value at 0 hour. For example, ΔDf at 72 hours is the difference between the Df value at 72 hours and the Df value at 0 hour.

TABLE 3-5

Properties of metal-clad laminates of Examples 16 to 19

| | | Example | | | |
|---|---|---|---|---|---|
| | | 16 | 17 | 18 | 19 |
| Cooling rate (unit: °C./min) | | 3.00 | 3.00 | 1.00 | 1.00 |
| Crystallinity of fluoropolymer (A) | | 40% | 40% | 59% | 57% |
| Df × 10⁻³ @10 GHz | 0 hour | 0.90 | 0.90 | 0.89 | 0.90 |
| | 72 hours | 2.44 | 2.45 | 2.44 | 2.45 |
| | 168 hours | 2.66 | 2.61 | 2.66 | 2.53 |
| | 240 hours | 2.87 | 2.82 | 2.90 | 2.82 |
| | 336 hours | 3.48 | 3.28 | 3.36 | 3.28 |
| | 408 hours | 3.90 | 3.66 | 3.75 | 3.66 |
| ΔDf × 10⁻³ @10 GHz | 0 hour | 0.00 | 0.00 | 0.00 | 0.00 |
| | 72 hours | 1.54 | 1.55 | 1.55 | 1.55 |
| | 168 hours | 1.76 | 1.71 | 1.77 | 1.63 |
| | 240 hours | 1.97 | 1.92 | 2.01 | 1.92 |
| | 336 hours | 2.58 | 2.38 | 2.47 | 2.38 |
| | 408 hours | 3.00 | 2.76 | 2.86 | 2.76 |

TABLE 3-5-continued

Properties of metal-clad laminates of Examples 16 to 19

| | | | Example | | | |
|---|---|---|---|---|---|---|
| | | | 16 | 17 | 18 | 19 |
| Dimensional stability (unit: ppm) | NE1035 | longitudinal | 1659 | 1634 | 1005 | 1050 |
| | | lateral | 1039 | 1179 | 661 | 352 |
| | NE1078 | longitudinal | 1530 | 1531 | 1066 | 1071 |
| | | lateral | 886 | 1024 | 558 | 529 |

Note:
ΔDf is the difference between the Df value at a given time and the Df value at 0 hour. For example, ΔDf at 72 hours is the difference between the Df value at 72 hours and the Df value at 0 hour.

TABLE 3-6

Properties of metal-clad laminates of Examples 20 to 23

| | | Example | | | |
|---|---|---|---|---|---|
| | | 20 | 21 | 22 | 23 |
| Cooling rate (unit: °C./min) | | 0.30 | 0.30 | 0.25 | 0.25 |
| Crystallinity of fluoropolymer (A) | | 70 | 70 | 75 | 75 |
| Df × 10⁻³ @10 GHz | 0 hour | 0.79 | 0.76 | 0.68 | 0.77 |
| | 72 hours | 1.14 | 1.14 | 0.97 | 1.09 |
| | 168 hours | 1.21 | 1.23 | 1.08 | 1.11 |
| | 240 hours | 1.23 | 1.24 | 1.13 | 1.15 |
| | 336 hours | 1.29 | 1.29 | 1.20 | 1.18 |
| | 408 hours | 1.33 | 1.31 | 1.25 | 1.23 |
| ΔDf × 10⁻³ @10 GHz | 0 hour | 0.00 | 0.00 | 0.00 | 0.00 |
| | 72 hours | 0.35 | 0.38 | 0.29 | 0.32 |
| | 168 hours | 0.42 | 0.47 | 0.40 | 0.34 |
| | 240 hours | 0.44 | 0.48 | 0.45 | 0.38 |
| | 336 hours | 0.50 | 0.53 | 0.52 | 0.41 |
| | 408 hours | 0.54 | 0.55 | 0.57 | 0.46 |
| Dimensional stability (unit: ppm) | NE1035 longitudinal | 959 | 920 | 909 | 849 |
| | lateral | 462 | 581 | 497 | 412 |
| | NE1078 longitudinal | 956 | 962 | 887 | 841 |
| | lateral | 525 | 397 | 536 | 385 |

Note:
ΔDf is the difference between the Df value at a given time and the Df value at 0 hour. For example, ΔDf at 72 hours is the difference between the Df value at 72 hours and the Df value at 0 hour.

TABLE 3-7

Properties of metal-clad laminates of Comparative Examples 4 to 7

| | | Comparative Example | | | |
|---|---|---|---|---|---|
| | | 4 | 5 | 6 | 7 |
| Cooling rate (unit: °C./min) | | 4.00 | 3.50 | 3.50 | 3.50 |
| Crystallinity of fluoropolymer (A) | | 35 | 36 | 36 | 37 |
| Df × 10⁻³ @10 GHz | 0 hour | 0.90 | 0.90 | 0.89 | 0.90 |
| | 72 hours | 2.68 | 2.70 | 2.68 | 2.70 |
| | 168 hours | 2.93 | 2.87 | 2.93 | 2.78 |
| | 240 hours | 3.16 | 3.10 | 3.19 | 3.10 |
| | 336 hours | 3.83 | 3.61 | 3.70 | 3.61 |
| | 408 hours | 4.29 | 4.03 | 4.13 | 4.03 |
| ΔDf × 10⁻³ @10 GHz | 0 hour | 0.00 | 0.00 | 0.00 | 0.00 |
| | 72 hours | 1.78 | 1.80 | 1.79 | 1.80 |
| | 168 hours | 2.03 | 1.97 | 2.04 | 1.88 |
| | 240 hours | 2.26 | 2.20 | 2.30 | 2.20 |
| | 336 hours | 2.93 | 2.71 | 2.81 | 2.71 |
| | 408 hours | 3.39 | 3.13 | 3.24 | 3.13 |

TABLE 3-7-continued

Properties of metal-clad laminates of Comparative Examples 4 to 7

|  |  |  | Comparative Example | | | |
|---|---|---|---|---|---|---|
|  |  |  | 4 | 5 | 6 | 7 |
| Dimensional stability (unit: ppm) | NE1035 | longitudinal | 1692 | 1685 | 1670 | 1575 |
|  |  | lateral | 1690 | 882 | 835 | 760 |
|  | NE1078 | longitudinal | 1659 | 1589 | 1522 | 1539 |
|  |  | lateral | 1522 | 1044 | 860 | 805 |

Note:
ΔDf is the difference between the Df value at a given time and the Df value at 0 hour. For example, ΔDf at 72 hours is the difference between the Df value at 72 hours and the Df value at 0 hour.

As shown in Table 3-1, the metal-clad laminates of the present invention possess good Df and relatively small ΔDf, indicating that the dielectric properties of the metal-clad laminates are environmentally stable. Examples 1 to 5 demonstrate that, when the specific surface area of filler (B) is the only variable, the smaller specific surface area, the smaller the ΔDf of the metal-clad laminate. Without being bound by theory, it is believed that this is because a smaller specific surface area means less surface area of the filler is exposed to moisture, resulting in more stable ΔDf. Unlike the present invention, Comparative Example 1 shows that, when the specific surface area of filler (B) is higher than 2.5 $m^2/g$, the metal-clad laminate has a larger ΔDf value, indicating that its dielectric properties is not environmentally stable.

As shown in Table 3-2, Table 3-3 and Table 3-4, the metal-clad laminates of the present invention possess good Df, relatively small ΔDf, and good dimensional stability. Examples 6 to 15 demonstrate that, when the crystallinity of fluoropolymer (A) is the only variable, higher crystallinity results in smaller ΔDf and better dimensional stability of the metal-clad laminate. Unlike the present invention, Comparative Examples 2 and 3 show that if the crystallinity of fluoropolymer (A) is below 40%, the ΔDf and dimensional stability of the metal-clad laminates cannot reach satisfactory levels.

As shown in Table 3-5, Table 3-6 and Table 3-7, the metal-clad laminates of the present invention possess good Df, relatively small ΔDf, and good dimensional stability. Examples 16 to 23 demonstrate that, even when changing the type of fluoropolymer (A), as long as the crystallinity and fluorine atom content of fluoropolymer (A) are within the specified ranges, the ΔDf and dimensional stability of the metal-clad laminate can reach satisfactory levels. Unlike the present invention, Comparative Examples 4 to 7 show that if the crystallinity of fluoropolymer (A) is below 40%, the ΔDf and dimensional stability of the metal-clad laminate cannot reach satisfactory levels.

The above embodiments are merely illustrative description of the principles and effects of the present invention and are intended to explain the inventive features of the present invention, not to limit the scope of protection of the present invention. Any modifications or arrangements easily accomplished by persons skilled in this field are within the scope claimed by the present invention. Therefore, the scope of protection of the present invention is defined by the appended claims.

What is claimed is:

1. A metal-clad laminate, comprising:
   a dielectric layer, which comprises a dielectric material; and
   a conductive layer, which is disposed on at least one side of the dielectric layer,
   wherein the dielectric material comprises a fluoropolymer (A) and a filler (B), the fluoropolymer (A) has a crystallinity ranging from 40% to 80%, and the filler (B) has a specific surface area ranging from 0.3 $m^2/g$ to less than 2.5 $m^2/g$.

2. The metal-clad laminate of claim 1, wherein the filler (B) has a specific surface area ranging from 0.3 $m^2/g$ to 2.0 $m^2/g$.

3. The metal-clad laminate of claim 1, wherein the filler (B) is selected from the group consisting of silicon dioxide, alumina, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond powder, diamond-like powder, graphite, calcined kaolin, pryan, mica, hydrotalcite, glass bead, ceramic whisker, carbon nanotube, nanosized inorganic powder, strontium titanate, and combinations thereof.

4. The metal-clad laminate of claim 1, wherein based on the total weight of the dielectric material, the amount of the filler (B) ranges from 34 wt % to 59 wt %.

5. The metal-clad laminate of claim 1, wherein the fluoropolymer (A) is selected from the group consisting of polytetrafluoroethylene (PTFE), fluorinated ethylene propylene copolymer (FEP copolymer), polyfluoroalkoxy alkane (PFA), polychlorotrifluoroethylene (PCTFE), polyvinylidene difluoride (PVDF), polyvinyl fluoride (PVF), ethylene-tetrafluoroethylene copolymer (ETFE copolymer), ethylene-chloro trifluoroethylene copolymer (ECTFE copolymer), and combinations thereof.

6. The metal-clad laminate of claim 1, wherein the fluoropolymer (A) has a fluorine atom content of 60% or more based on the total atom number of repeating units of the fluoropolymer (A).

7. The metal-clad laminate of claim 1, wherein based on the total weight of the dielectric material, the amount of the fluoropolymer (A) ranges from 40 wt % to 65 wt %.

8. The metal-clad laminate of claim 1, wherein the dielectric layer further comprises a reinforcing material.

9. The metal-clad laminate of claim 1, wherein the conductive layer is a copper conductive layer.

10. The metal-clad laminate of claim 1, wherein the conductive layer is a patterned conductive layer.

* * * * *